(12) United States Patent
Seigel

(10) Patent No.: US 9,569,287 B1
(45) Date of Patent: Feb. 14, 2017

(54) SYSTEM AND METHOD FOR INTERACTIVE TUTORIALS

(71) Applicant: Quest Software, Inc., Aliso Viejo, CA (US)

(72) Inventor: Jake Seigel, Halifax (CA)

(73) Assignee: Dell Software Inc., Aliso Viejo, CA (US)

( * ) Notice: Subject to any disclaimer, the term of this patent is extended or adjusted under 35 U.S.C. 154(b) by 289 days.

(21) Appl. No.: 13/804,476

(22) Filed: Mar. 14, 2013

(51) Int. Cl.
*G06F 15/16* (2006.01)
*G06F 9/54* (2006.01)
*H04M 1/725* (2006.01)

(52) U.S. Cl.
CPC .......... *G06F 9/542* (2013.01); *H04M 1/72586* (2013.01); *H04M 2250/56* (2013.01)

(58) Field of Classification Search
CPC ............. G06F 9/4446; H04M 1/72586; H04M 2250/56
See application file for complete search history.

(56) References Cited

U.S. PATENT DOCUMENTS

| | | | |
|---|---|---|---|
| 4,772,206 A | 9/1988 | Kerr et al. | |
| 4,941,829 A | 7/1990 | Estes et al. | |
| 5,318,449 A | 6/1994 | Schoell et al. | |
| 5,395,243 A * | 3/1995 | Lubin et al. | 434/118 |
| 5,442,759 A | 8/1995 | Chiang et al. | |
| 5,493,658 A | 2/1996 | Chiang et al. | |
| 5,535,422 A | 7/1996 | Chiang et al. | |
| 5,577,186 A | 11/1996 | Mann, II et al. | |
| 6,014,134 A * | 1/2000 | Bell et al. | 715/705 |
| 6,267,601 B1 | 7/2001 | Jongsma et al. | |
| 6,493,536 B1 | 12/2002 | Jongsma et al. | |
| 6,599,130 B2 | 7/2003 | Moehrle | |
| 6,692,256 B2 | 2/2004 | Chan et al. | |
| 6,768,894 B2 | 7/2004 | Jongsma et al. | |
| 6,931,385 B1 | 8/2005 | Halstead et al. | |
| 6,970,677 B2 | 11/2005 | Jongsma et al. | |
| 7,631,254 B2 | 12/2009 | Layard et al. | |
| 8,538,947 B2 * | 9/2013 | Matejka et al. | 707/707 |
| 2002/0168616 A1 * | 11/2002 | Chan et al. | 434/118 |
| 2004/0086834 A1 * | 5/2004 | Harned et al. | 434/118 |
| 2007/0061722 A1 * | 3/2007 | Kronlund et al. | 715/705 |
| 2007/0122789 A1 * | 5/2007 | Yoo | 434/323 |
| 2009/0137321 A1 * | 5/2009 | Katsume et al. | 463/42 |
| 2010/0017695 A1 * | 1/2010 | Palmieri | 715/205 |
| 2011/0200980 A1 * | 8/2011 | Takahashi | G06F 9/4446 434/365 |
| 2012/0042002 A1 * | 2/2012 | Smith et al. | 709/203 |

OTHER PUBLICATIONS

Li, Wei et al., "GamiCAD: A Gamified Tutorial System for First Time AutoCAD Users", UIST '12, Oct. 2012, (pp. 103-112).

* cited by examiner

*Primary Examiner* — Yves Dalencourt
(74) *Attorney, Agent, or Firm* — Winstead PC

(57) ABSTRACT

In one embodiment, a method includes initializing a software application operable to switch between a standard mode and a tutorial mode. The software application includes a standard function set, a tutorial function set, and a user interface operable to supply events. The method further includes, in the standard mode, routing the events to the standard function set. In addition, the method includes, in the tutorial mode, diverting the events to the tutorial function set.

18 Claims, 4 Drawing Sheets

SYSTEM AND METHOD FOR INTERACTIVE TUTORIALS

BACKGROUND

Technical Field

The present invention relates generally to computing and more particularly, but not by way of limitation, to systems and methods for interactive tutorials.

History of Related Art

When end users want to learn how to use a software application, they often rely upon some form of tutorial. Tutorials can include, for example, video, audio, and/or text that aims to impart knowledge about the software application and its features. Although tutorials can foster a better understanding of the software application, this understanding is generally untested and incomplete until the knowledge is applied. Therefore, tutorials usually force end users to engage in a trial-and-error process in an active environment of the software application. This can be a time-consuming and mistake-ridden process.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method includes, on at least one information handling system, initializing a software application operable to switch between a standard mode and a tutorial mode. The software application includes a standard function set, a tutorial function set, and a user interface operable to supply events. The method further includes, in the standard mode, the at least one information handling system routing the events to the standard function set. In addition, the method includes, in the tutorial mode, the at least one information handling system diverting the events to the tutorial function set.

In one embodiment, an information handling system includes at least one processing unit operable to implement a method. The method includes initializing a software application operable to switch between a standard mode and a tutorial mode. The software application includes a standard function set, a tutorial function set, and a user interface operable to supply events. The method further includes, in the standard mode, routing the events to the standard function set. In addition, the method includes, in the tutorial mode, diverting the events to the tutorial function set.

In one embodiment, a computer-program product includes a computer-usable medium having computer-readable program code embodied therein. The computer-readable program code is adapted to be executed to implement a method. The method includes initializing a software application operable to switch between a standard mode and a tutorial mode. The software application includes a standard function set, a tutorial function set, and a user interface operable to supply events. The method further includes, in the standard mode, routing the events to the standard function set. In addition, the method includes, in the tutorial mode, diverting the events to the tutorial function set.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

Figure 1:
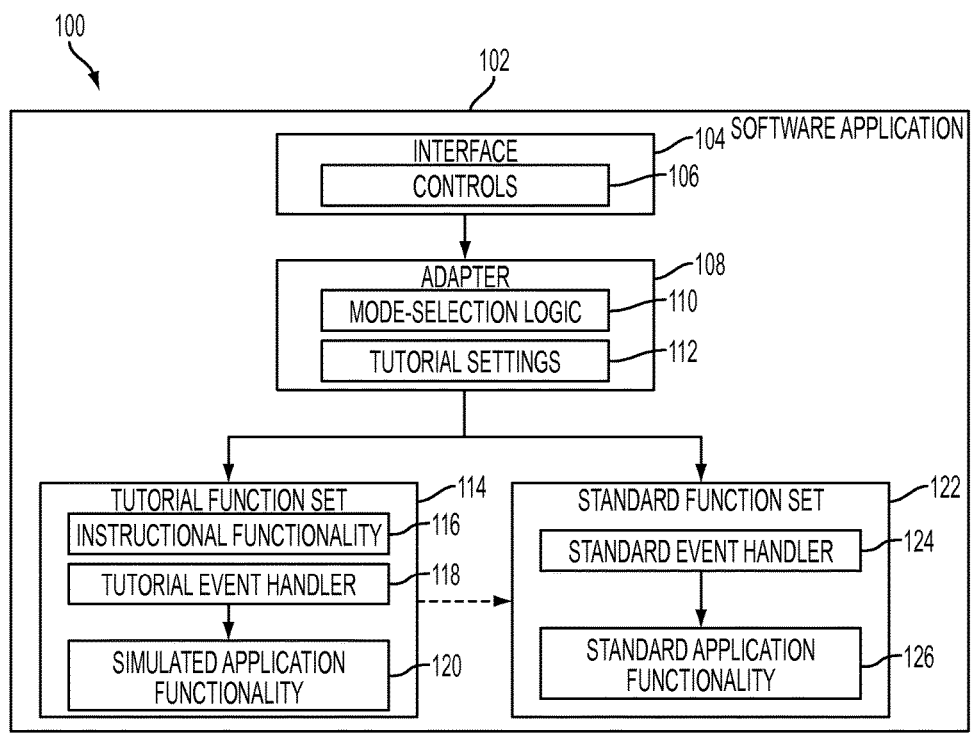
FIG. 1 illustrates an architecture of a software application.

In various embodiments, a software application can be developed that improves end-user learning efficiency via inclusion of a tutorial function set and a standard function set. A tutorial function set, as used herein, refers to application logic, event handlers, and/or other objects, methods, and data used by a software application for a tutorial purpose. A standard function set, as used herein, refers to application logic, event handlers, and/or other objects, methods, and data used by a software application for a standard (i.e., non-tutorial) purpose. In various embodiments, the software application has a standard mode in which events are routed to the standard function set for handling and a tutorial mode in which events are diverted to the tutorial function set for handling.

An event, as used herein, refers to an action that is handled by a piece of code inside a software application. For example, events can be initiated by users via, for example, a mouse, keyboard, touchscreen, camera, biometric sensor, or other device communicably coupled to a given information handling system. Therefore, events can be initiated, for example, by mouse click, keyboard press, touchscreen interaction, or other input. Some events can be initiated via a control. A control, as used herein, refers to an element of a graphical user interface (GUI) that is designed to be selectable, modifiable, or otherwise interacted with by an end user. Controls can include, for example, buttons, text boxes, sliders, list boxes, menus, menu bars, navigation controls (e.g., links, tabs, and scroll bars), containers (e.g. windows), and other similar GUI elements. Events can also be initiated via messages from other programs, by timers, and the like.

In various embodiments, the software application is operable to switch between the standard mode and the tutorial mode responsive to mode-switch events. A mode-switch event, as used herein, is an event as defined above that is a trigger condition for switching software-application modes.

A mode-switch event can be, for example, a button press or other indication from an end user that a mode switch is desired. The desired mode switch may be, for example, from the standard mode to the tutorial mode or from the tutorial mode to the standard mode.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

FIG. 1 illustrates an architecture 100 of a software application 102 that is operable to switch between a standard mode and a tutorial mode. The software application 102 includes an interface 104, an adapter 108, a tutorial function set 114, and a standard function set 122. In various embodiments, the software application 102 may be a native application executing on a particular information handling system. In various other embodiments, the software application 102 may be a distributed application such as, for example, a web application, executing on a distributed computer system.

The interface 104 includes one or more controls 106. The interface 104 may provide, for example, a GUI on which the one or more controls 106 are disposed. In a typical embodiment, the interface 104 is operable to listen for events via, for example, the one or more controls 106, and supply the events to the adapter 108. The supplied events can relate, for example, to end-user interaction with the one or more controls 106.

The adapter 108 includes mode-selection logic 110 and tutorial settings 112. The mode-selection logic 110 specifies criteria for determining whether the software application 102 should be in the standard mode or the tutorial mode at any given time. For example, the mode-selection logic 110 can specify a default mode for the software application 102 and one or more mode-switch events that should cause the software application 102 to switch modes. The default mode is generally the mode in which the software application 102 should operate upon an end user beginning a session in the software application 102. The default mode may be, for example, the standard mode. The specified one or more mode-switch events can be of any type that the interface 104 is operable to supply such as, for example, events indicative of interaction with particular controls of the one or more controls 106.

The tutorial settings 112 include settings for initializing the tutorial mode when a switch to the tutorial mode has been deemed necessary by the mode-selection logic 110. The tutorial settings 112 typically include mock data values that are used to populate the one or more controls 106. For example, the mock data values may provide items for a drop-down list or pre-filled text for a text box.

The standard function set 122 encapsulates application logic that should be used by the software application 102 while the software application 102 is in the standard mode. In this fashion, the standard function set 122 includes a standard event handler 124 and standard application functionality 126. The standard application functionality 126 includes objects, methods, and data (including calls to other objects, methods and data) that the software application 102 utilizes in the standard mode. The standard event handler 124 includes application logic for evaluating events received from the adapter 108 and taking appropriate action via the standard application functionality 126.

The tutorial function set 114 encapsulates functionality that should be used by the software application 102 while the software application 102 is in the tutorial mode. In this fashion, the tutorial function set 114 includes instructional functionality 116, a tutorial event handler 118, and simulated application functionality 120. The instructional functionality 116 includes operability to demonstrate how to use the software application 102. The instructional functionality 116 can include, for example, operability to present instructions as text, video, and/or audio. To the extent the instructions are visual in nature, the instructions may be presented via, for example, a pop-up window, a separate new window, or the like.

The simulated application functionality 120 includes objects, methods, and data (including calls to other objects, methods and data) that the software application 102 utilizes in the tutorial mode. As described in greater detail below, the simulated application functionality 120 can mimic functionality provided by the standard application functionality 126. In various embodiments, principles of inheritance can facilitate operation of the simulated application functionality 120. In particular, the objects of the simulated application functionality 120 may extend from the objects of the standard application functionality 126. In that way, methods defined by the objects of the standard application functionality 126 can be overridden by methods defined by the objects of the simulated application functionality 120.

For example, a given object of the standard application functionality 126 may define a method that stores new data in a database. In various embodiments, the simulated application functionality 120 may have a simulated object that extends from the given object and overrides the method that stores the new data in the database. Instead, the overriding method may store the new data in temporary memory so that, for purposes of the tutorial mode, the new data appears to the end user to be stored. In this fashion, modification of the database can be avoided.

Therefore, the simulated application functionality 120 helps safeguard configurations or data maintained by the standard application functionality 126. In various embodiments, all methods of the standard application functionality 126 are overridden. In various other embodiments, the simulated application functionality 120 only overrides selected methods such as, for example, those methods that can result in changes to data or configurations. In addition to simulating the standard application functionality 126, the simulated application functionality 120 may also evaluate end-user input against instructions provided by the instructional functionality 116 and perform action based thereon. For example, the simulated application functionality 120 may report success to the end user or provide additional help when instructions are not correctly followed.

The tutorial event handler 118 includes application logic for evaluating events received from the adapter 108 and taking appropriate action via the simulated application functionality 120. As described above with respect to the simulated application functionality 120, the tutorial event handler 118 may implement principles of inheritance to extend from the standard event handler 124. In this manner, methods addressing particular events may be overridden to provide different functionality.

In operation, the software application 102 is typically in the standard mode upon beginning an end-user session. The interface 104 streams events to the adapter 108 as the events are identified. As events are received, the adapter 108 evaluates the mode-selection logic 110 for purposes of identifying any mode-switch events. While in the standard mode, the adapter 108 routes the event stream to the standard event handler 124. Upon identification of a mode-switch event, the adapter 108 initializes the tutorial mode based on the tutorial settings 112. In addition, the adapter 108 begins diverting the event stream to the tutorial event handler 118. Upon identification of another mode-switch event, the adapter 108 returns to the standard mode.

In various embodiments, the software application 102 offers numerous advantages over traditional tutorials. For example, the tutorial mode can be used to offer a sandbox environment for learning the software application 102 from within the software application 102 without changing the interface 104. The adapter 108 diverts all events to the tutorial event handler 118 while the software application 102 is in the tutorial mode. Therefore, the tutorial function set 114 effectively hijacks the interface 104 for as long as the software application 102 remains in the tutorial mode. The tutorial event handler 118 safely handles all events in a manner that simulates the standard application functionality 126 but avoids unintended modification of any configurations or real-world data contained within or maintained by the standard application functionality 126.

Figure 2:
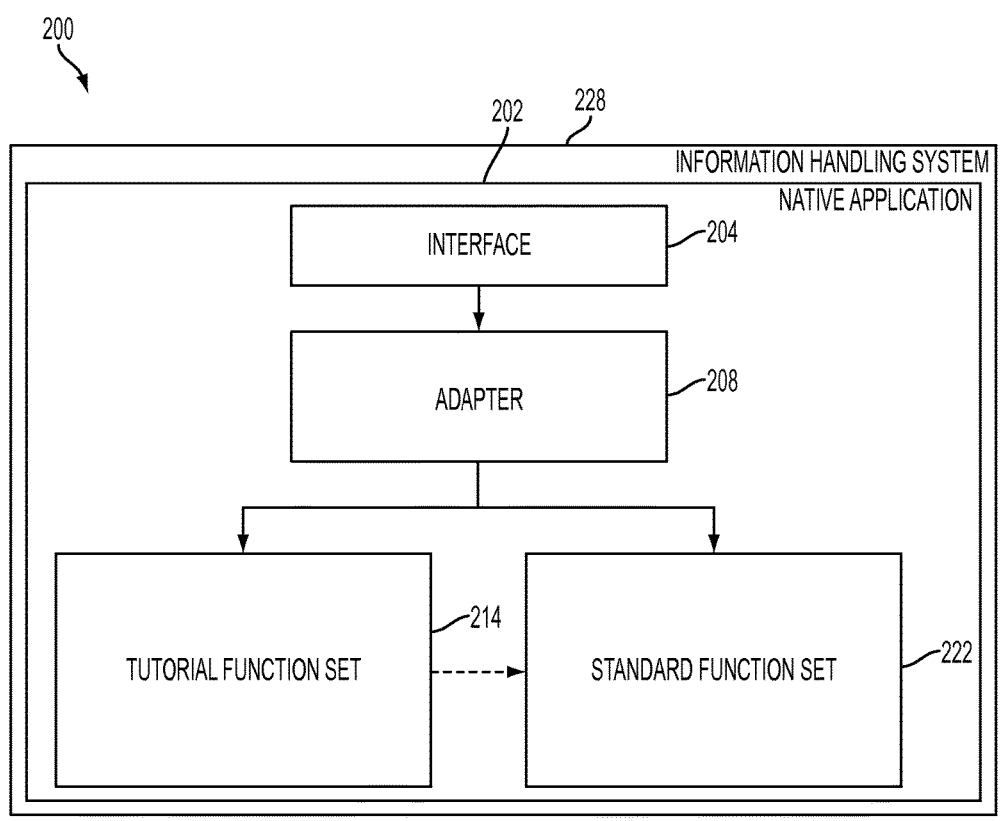
FIG. 2 illustrates an implementation of a native application.

FIG. 2 illustrates an implementation 200 of a native application 202 that is operable to switch between a standard mode and a tutorial mode. The native application 202 is operable to run in an operating-system environment provided by an information handling system 228. The information handling system 228 may be, for example, a desktop computer, laptop computer, tablet computer, smartphone, or other information handling system. The native application 202 includes an interface 204, an adapter 208, a tutorial function set 214, and a standard function set 222. In a typical embodiment, the native application 202, the interface 204, the adapter 208, the tutorial function set 214, and the standard function set 222 operate as described with respect to the software application 102, the interface 104, the adapter 108, the tutorial function set 114, and the standard function set 122, respectively, of FIG. 1.

Figure 3:
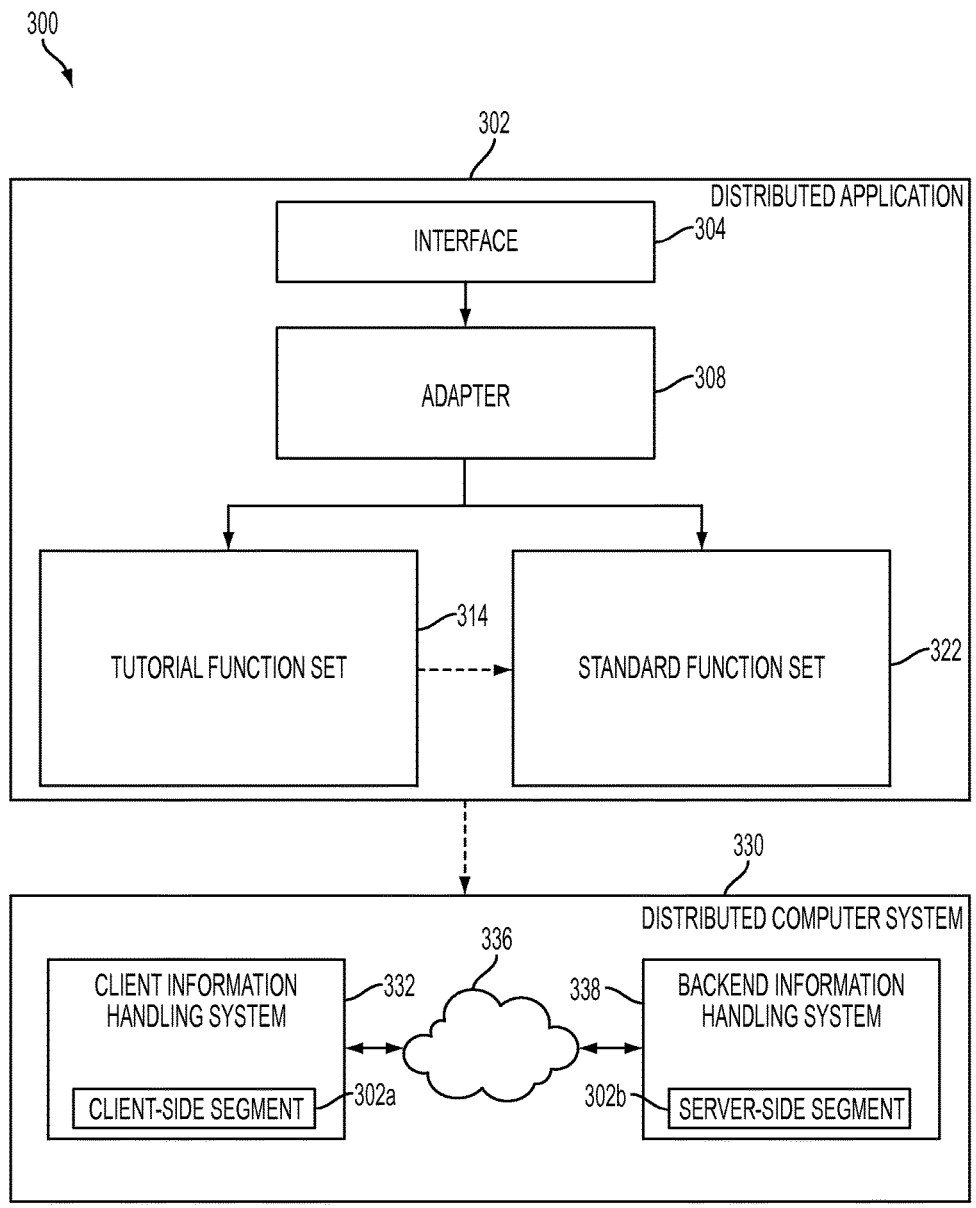
FIG. 3 illustrates a distributed implementation of a software application.

FIG. 3 illustrates a distributed implementation 300. The distributed implementation 300 includes a distributed application 302 that is operable to execute on a distributed computer system 330. The distributed application 302 includes an interface 304, an adapter 308, a tutorial function set 314, and a standard function set 322. The distributed computer system 330 includes a client information handling system 332 communicating with a backend information handling system 338 over a network 336. The backend information handling system 338 may include, for example, a web server. The interface 304 may be representative, for example, of a graphical web interface served by the backend information handling system 338 onto the client information handling system.

In various embodiments, the backend information handling system 338 may be representative of any combination of computing equipment including, for example, any number of physical or virtual computers and any number and organization of databases. The client information handling system 332 may be, for example, a desktop computer, laptop computer, tablet computer, smartphone, or other information handling system that is operated by an end user. In various embodiments, the network 336 can be viewed as an abstraction of multiple distinct networks via which the backend information handling system 338 is operable to communicate. For example, the network 336 can include one or multiple communications networks such as, for example, public or private intranets, a public switched telephone network (PSTN), a cellular network, the Internet, or the like.

In a typical embodiment, the distributed application 302, the interface 304, the adapter 308, the tutorial function set 314, and the standard function set 322 operate as described with respect to the software application 102, the interface 104, the adapter 108, the tutorial function set 114, and the standard function set 122, respectively, of FIG. 1. More particularly, however, the distributed application 302 has been apportioned into a client-side segment 302a and a server-side segment 302b. As shown, the client information handling system 332 executes the client-side segment 302a and the backend information handling system 338 executes the server-side segment 302b. In various embodiments, the client-side segment 302a can be implemented as client-side scripting such as, for example, JavaScript.

The distributed application 302 can be distributed onto the client information handling system 332 and the backend information handling system 338 in any number of fashions. For example, in some embodiments, the client-side segment 302a includes the interface 304 while the server-side segment 302b includes the adapter 308, the tutorial function set 314, and the standard function set 322. By way of further example, in various embodiments, the client-side segment 302a includes both the interface 304 and the adapter 308 while the server-side segment 302b includes the tutorial function set 314 and the standard function set 322. In still other embodiments, a portion of the adapter 308 may be included in each of the client-side segment 302a and the server-side segment 302b. In some embodiments, the client-side segment 302a may include an entirety of the distributed application 302. In these embodiments, the server-side segment 302b may either be empty or only include functionality to serve the distributed application 302 to the client information handling system 332.

Figure 4:
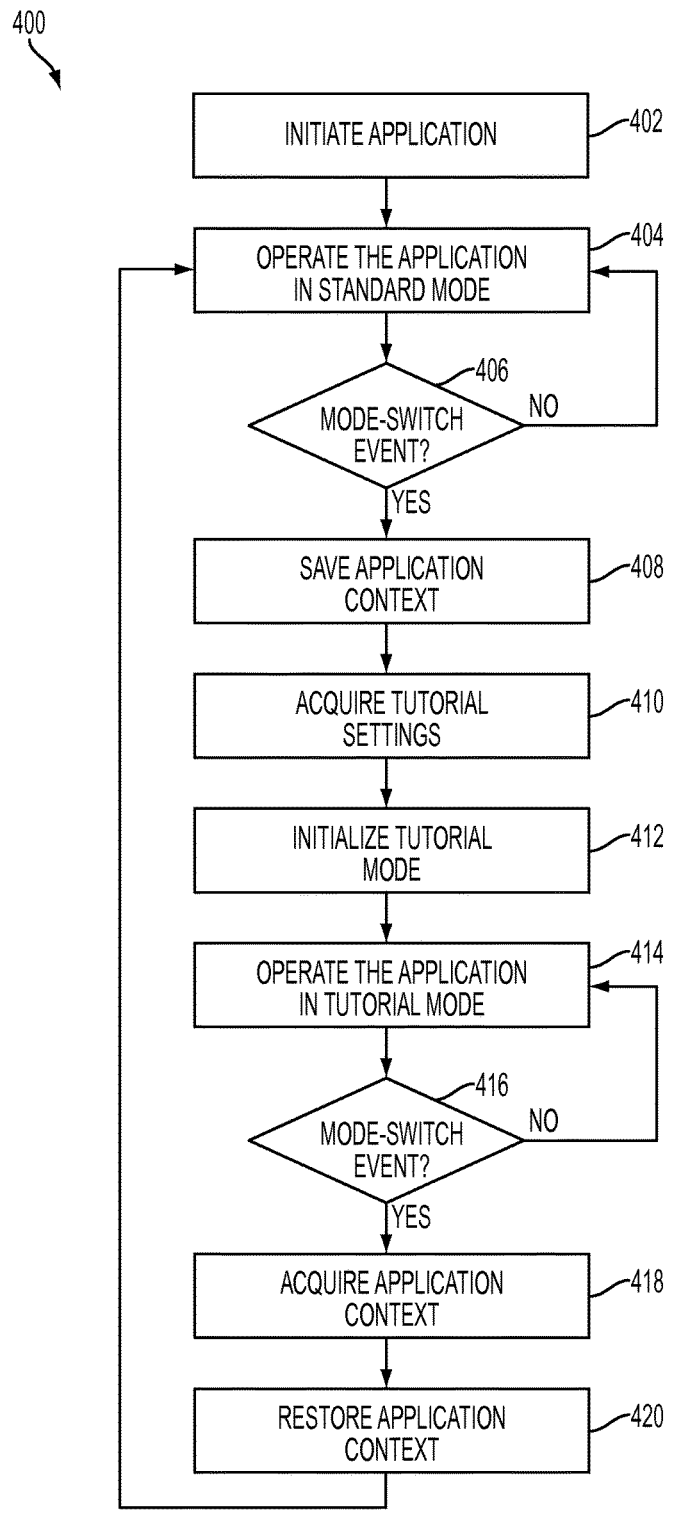
FIG. 4 illustrates a process that may be executed by at least one information handling system.

FIG. 4 illustrates a process 400 that may be executed by at least one information handling system such as, for example, the information handling system 228 of FIG. 1 or the distributed computer system 330 of FIG. 3. The at least one information handling system has a software application resident thereon that is operable to switch between a standard mode and a tutorial mode. The software application may be, for example, the native application 202 of FIG. 2 or the distributed application 302 of FIG. 3. The process 400 begins at step 402.

At step 402, the at least one information handling system initiates the software application. If the software application is a native application such as, for example, the native application 202 of FIG. 2, initiating the software application may involve the at least one information handling system executing the software application. If the software application is a distributed application such as, for example, the distributed application 302 of FIG. 3, initiating the software application may involve an end user beginning a web session via the software application. From step 402, the process 400 proceeds to step 404.

At step 404, the at least one information handling system operates the software application in the standard mode as described, for example, with respect to FIGS. 1-3. From step 404, the process 400 proceeds to step 406. At step 406, the information handling system determines whether a mode-switch event has occurred responsive, for example, to events being supplied by an interface such as, for example, the interface 104 of FIG. 1, the interface 204 of FIG. 2, or the interface 304 of FIG. 3. If no mode-switch event has occurred, the process 400 returns to step 404 and continues to operate in the standard mode. If it is determined at step 406 that a mode-switch event has occurred, the process 400 proceeds to step 408.

At step 408, the at least one information handling system saves an application context in memory. The application context typically includes information about one or more controls such as, for example, the one or more controls 106 of FIG. 1. The information can include, for example, current data values (e.g., in a drop-down list) or end-user configurations such as, for example, window or pane sizes, and the like. From step 408, the process 400 proceeds to step 410. At step 410, the at least one information handling system acquires tutorial settings such as, for example, the tutorial settings 112 of FIG. 1. From step 410, the process 400 proceeds to step 412.

At step 412, the at least one information handling system initializes the tutorial mode of the software application based on the tutorial settings. The initializing may involve, for example, populating the one or more controls with mock data values as described with respect to FIG. 1. From step 412, the process 400 proceeds to step 414. At step 414, the at least one information handling system operates the software application in the tutorial mode as described with respect to FIGS. 1-3. From step 414, the process 400 proceeds to step 416.

At step 416, the at least one information handling system determines whether another mode-switch event has occurred responsive, for example, to events being supplied by the interface. If no mode-switch event has occurred, the process 400 returns to step 414 and continues to operate in the tutorial mode. If it is determined at step 416 that another mode-switch event has occurred, the process 400 proceeds to step 418. At step 418, the at least one information handling system acquires the application context that was saved at step 408. From step 418, the process 400 proceeds to step 420.

At step 420, the at least one information handling system restores the application context. From step 420, the process 400 returns to step 404 so that the information handling system can operate the software application in the standard mode. In a typical embodiment, execution of the process 400 continues until an end-user session is concluded, for example, by the end user exiting the software application, leaving a web site on which the software application is provided, navigating to another web site, or the like.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising:
   on at least one information handling system, initializing a software application operable to switch between a standard mode and a tutorial mode;
   wherein the software application comprises a standard function set, a tutorial function set, and a user interface operable to supply events;
   in the standard mode, the at least one information handling system routing the events to the standard function set;
   in the tutorial mode, the at least one information handling system diverting the events to the tutorial function set;
   wherein the standard function set comprises standard application functionality;
   wherein the tutorial function set comprises simulated application functionality;
   wherein objects of the simulated application functionality extend from objects of the standard application functionality, wherein methods defined by the objects of the standard application functionality are overridden by methods defined by the objects of the simulated application functionality, wherein the overriding comprises storing new data in temporary memory thereby avoiding modification to data maintained by the standard application functionality; and
   wherein the switch between operation of the at least one information handling system in the standard mode and operation of the at least one information handling system in the tutorial mode is performed by the software application upon detecting at least one mode-switch event and without manual interaction by a user.

2. The method of claim 1, comprising operating the software application in the standard mode.

3. The method of claim 2, comprising:
   receiving a first mode-switch event;
   saving an application context;
   initializing the tutorial mode; and
   operating the software application in the tutorial mode.

4. The method of claim 3, comprising:
   receiving a second mode-switch event;
   acquiring the application context;
   restoring the application context; and
   operating the software application in the standard mode.

5. The method of claim 1, wherein the software application is a native application executing on the at least one information handling system.

6. The method of claim 1, the method comprising:
   wherein the software application is a distributed application comprising a client-side segment and a server-side segment; and
   wherein the at least one information handling system comprises a client information handling system and a backend information handling system, the client information handling system operable to execute the client-side segment and the backend information handling system operable to execute the server-side segment.

7. The method of claim 1, wherein the standard function set further comprises a standard event handler.

8. The method of claim 7, wherein the tutorial function set further comprises instructional functionality and a tutorial event handler.

9. The method of claim 1, wherein the software application comprises an adapter operable to communicate between the user interface and each of the standard function set and the tutorial function set.

10. An information handling system comprising:
at least one processing unit, wherein the processing unit is operable to perform a method comprising:
initializing a software application operable to switch between a standard mode and a tutorial mode;
wherein the software application comprises a standard function set, a tutorial function set, and a user interface operable to supply events;
in the standard mode, routing the events to the standard function set; and
in the tutorial mode, diverting the events to the tutorial function set;
wherein the standard function set comprises standard application functionality;
wherein the tutorial function set comprises simulated application functionality;
wherein objects of the simulated application functionality extend from objects of the standard application functionality, wherein methods defined by the objects of the standard application functionality are overridden by methods defined by the objects of the simulated application functionality, wherein the overriding comprises storing new data in temporary memory thereby avoiding modification to data maintained by the standard application functionality; and
wherein the switch between operation of the at least one information handling system in the standard mode and operation of the at least one information handling system in the tutorial mode is performed by the software application upon detecting at least one mode-switch event and without manual interaction by a user.

11. The information handling system of claim 10, the method comprising operating the software application in the standard mode.

12. The information handling system of claim 11, the method comprising:
receiving a first mode-switch event;
saving an application context;
initializing the tutorial mode; and
operating the software application in the tutorial mode.

13. The information handling system of claim 12, the method comprising:
receiving a second mode-switch event;
acquiring the application context;
restoring the application context; and
operating the software application in the standard mode.

14. The information handling system of claim 10, wherein the software application is a native application executing on the information handling system.

15. The information handling system of claim 10, wherein the software application is a distributed application comprising a client-side segment and a server-side segment.

16. The information handling system of claim 10, comprising:
wherein the standard function set further comprises a standard event handler; and
wherein the tutorial function set further comprises instructional functionality and a tutorial event handler.

17. The information handling system of claim 10, wherein the software application comprises an adapter operable to communicate between the user interface and each of the standard function set and the tutorial function set.

18. A computer-program product comprising a non-transitory computer-usable medium having computer-readable program code embodied therein, the computer-readable program code adapted to be executed to implement a method comprising:
initializing a software application operable to switch between a standard mode and a tutorial mode;
wherein the software application comprises a standard function set, a tutorial function set, and a user interface operable to supply events;
in the standard mode, routing the events to a standard function set; and
in the tutorial mode, diverting the events to a tutorial function set;
wherein the standard function set comprises standard application functionality;
wherein the tutorial function set comprises simulated application functionality;
wherein objects of the simulated application functionality extend from objects of the standard application functionality, wherein methods defined by the objects of the standard application functionality are overridden by methods defined by the objects of the simulated application functionality, wherein the overriding comprises storing new data in temporary memory thereby avoiding modification to data maintained by the standard application functionality; and
wherein the switch between operation of the at least one information handling system in the standard mode and operation of the at least one information handling system in the tutorial mode is performed by the software application upon detecting at least one mode-switch event and without manual interaction by a user.

* * * * *